(12) United States Patent
Tang (10) Patent No.: US 11,546,964 B2
(45) Date of Patent: *Jan. 3, 2023

(54) METHOD AND DEVICE FOR DISCONTINUOUS RECEPTION

(71) Applicant: Guangdong OPPO Mobile Telecommunications Corp., Ltd., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 54 days.

This patent is subject to a terminal disclaimer.

(21) Appl. No.: 16/607,197

(22) PCT Filed: May 4, 2017

(86) PCT No.: PCT/CN2017/083077
§ 371 (c)(1),
(2) Date: Oct. 22, 2019

(87) PCT Pub. No.: WO2018/201401
PCT Pub. Date: Nov. 8, 2018

(65) Prior Publication Data
US 2021/0227618 A1 Jul. 22, 2021

(51) Int. Cl.
*H04W 76/28* (2018.01)
*H04W 52/02* (2009.01)
*H04W 72/04* (2009.01)

(52) U.S. Cl.
CPC ....... *H04W 76/28* (2018.02); *H04W 52/0229* (2013.01); *H04W 72/044* (2013.01)

(58) Field of Classification Search
None
See application file for complete search history.

(56) References Cited

U.S. PATENT DOCUMENTS

2008/0267105 A1* 10/2008 Wang ............... H04W 56/005
370/311
2011/0105069 A1* 5/2011 Gaal ................. H04W 76/28
455/226.1
(Continued)

FOREIGN PATENT DOCUMENTS

CN  102187611 A  *  9/2011  ........... H04W 24/00
CN  102316562 A      1/2012
(Continued)

OTHER PUBLICATIONS

Qualcomm Incorporated, Efficient monitoring of DL control channels, 3GPP TSG RAN WG1 Meeting #88bis, R1-1705012, Apr. 3-7, 2017. (7 pages).
(Continued)

*Primary Examiner* — Jamaal Henson
(74) *Attorney, Agent, or Firm* — Young Basile Hanlon & MacFarlane, P.C.

(57) ABSTRACT

A method for discontinuous reception and a device are provided. The method includes: a terminal device determines at least one target discontinuous reception (DRX) indication signal among multiple DRX indication signals and/or a time-frequency resource position occupied by the at least one target DRX indication signal, wherein the at least one target DRX indication signal is used for instructing the terminal device to perform a target behavior in one DRX cycle after receiving the at least one target DRX indication signal; and the terminal device detects a DRX indication signal sent by a network device according to the at least one target DRX indication signal and/or the time-frequency resource position occupied by the at least one target DRX indication signal.

32 Claims, 4 Drawing Sheets

[Figure: Flowchart 100 showing steps S110 and S120 describing the method as in abstract]

(56) References Cited

U.S. PATENT DOCUMENTS

| | | | | |
|---|---|---|---|---|
| 2012/0122495 A1* | 5/2012 | Weng | H04W 68/025 | 455/458 |
| 2012/0275364 A1* | 11/2012 | Anderson | H04W 52/0222 | 370/311 |
| 2012/0275365 A1* | 11/2012 | Anderson | H04W 68/025 | 370/311 |
| 2012/0275366 A1* | 11/2012 | Anderson | H04W 52/0219 | 370/311 |
| 2013/0114484 A1* | 5/2013 | Suzuki | H04W 72/082 | 370/329 |
| 2013/0176873 A1* | 7/2013 | Ji | H04W 76/28 | 455/67.11 |
| 2013/0242833 A1* | 9/2013 | Ahn | H04W 76/28 | 370/311 |
| 2014/0112243 A1* | 4/2014 | Suzuki | H04W 56/00 | 370/328 |
| 2014/0269480 A1 | 9/2014 | Han | | |
| 2015/0181641 A1* | 6/2015 | Farajidana | H04W 24/08 | 370/311 |
| 2015/0257202 A1* | 9/2015 | Sammour | H04W 52/0206 | 370/311 |
| 2016/0081020 A1 | 3/2016 | Rahman et al. | | |
| 2016/0128128 A1* | 5/2016 | Ang | H04W 76/28 | 370/311 |
| 2017/0019948 A1 | 1/2017 | Baghel et al. | | |
| 2017/0251518 A1* | 8/2017 | Agiwal | H04W 76/28 | |
| 2018/0070406 A1* | 3/2018 | Chen | H04W 72/005 | |
| 2020/0145921 A1* | 5/2020 | Zhang | H04W 52/0229 | |
| 2021/0195521 A1* | 6/2021 | Müller | H04W 52/0216 | |

FOREIGN PATENT DOCUMENTS

| | | | | |
|---|---|---|---|---|
| CN | 102625432 A | 8/2012 | | |
| CN | 102932884 A | 2/2013 | | |
| CN | 106034318 A | 10/2016 | | |
| CN | 106550439 A | 3/2017 | | |
| JP | 2015512178 A | 4/2015 | | |
| RU | 2014113093 A | 10/2015 | | |
| WO | 2013075651 A1 | 5/2013 | | |
| WO | 2015174327 A1 | 11/2015 | | |
| WO | 2016121786 A1 | 8/2016 | | |
| WO | 2016141560 A1 | 9/2016 | | |
| WO | 2017022902 A1 | 2/2017 | | |
| WO | 2018045192 A1 | 3/2018 | | |
| WO | WO-2018202751 A1 * | 11/2018 | | H04W 4/70 |
| WO | WO-2018202751 A1 * | 11/2018 | | H04W 4/70 |

OTHER PUBLICATIONS

Samsung, Power consumption reduction for paging and connected-mode DRX for eMTC, 3GPP TSG RAN WG1 #88bis, R1-1705305, Apr. 3-7, 2017. (3 pages).
Chile Office Action with English Translation for CL Application 2019-003088 dated Mar. 16, 2021. (11 pages).
India Office Action for IN Application 201917044729 dated Jan. 29, 2021. (6 pages).
Japan Office Action with English Translation for JP Application 2019-559350 dated Feb. 22, 2021. (8 pages).
Singapore Office Action for SG Application 11201910220Y dated Apr. 13, 2021. (7 pages).
Russia Notice of Allowance and English translation of RU Application 2019137489/07(073986) dated Jul. 14, 2020.
Extended European Search Report for European Application No. 17908407.4 dated Feb. 28, 2020.
First CA Office Action for Application No. 3,063,210 dated Dec. 9, 2020.
First CL Office Action with English Translation for Application No. 201903088 dated Nov. 9, 2020.
First KR Office Action with English Translation for Application No. 10-2019-7032770 dated Nov. 19, 2020.
EP Examination Reported for Application No. 17908407.4 dated Oct. 23, 2020.
3GPP TSG RAN WG1 Meeting #88bis; R1-1704282; Spokane, USA, Apr. 3-7, 2017; Agenda Item: 7.2.6.2; Source: Huawei, HiSilicon; Title: Considerations on 'wake-up signal' for eFeMTC; Document for: Discussion and decision.
3GPP TSG RAN WG1; Meeting #88bis; R1-1704693; Spokane, USA Apr. 3-7, 2017; Source: Intel Corporation; Title: DL Power Consumption Reduction for efeMTC; Agenda Item: 7.2.6.2; Document for: Discussion/Decision.
Qualcomm Incorporated, UE Power Evaluation for DRX with Wake-Up Signaling, 3GPP TSG-RAN WG1 NR AdHoc, R1-1700820, Jan. 16-20, 2017. (7 pages).
Australian Examination Report for AU Application 2017412457 dated Mar. 10, 2022. (4 pages).
Chinese First Office Action with English Translation for CN Application 201780090339.7 dated Mar. 9, 2022. (17 pages).
Taiwan Office Action with English Translation for TW Application 107114479 dated Feb. 18, 2022. (6 pages).
Indonesia Examination Report with English Translation for ID Application P00201911044 dated Sep. 17, 2021. (10 pages).
Japanese Office Action with English Translation for JP Application 2019-559350 dated Nov. 26, 2021. (12 pages).
Brazilian First Office Action with English Translation for BR Application 1120190226966 dated Jul. 13, 2022. (3 pages).
Communication pursuant to Article 94(3) EPC for EP Application 17908407.4 dated May 10, 2022. (6 pages).
Canadian Examination Report for CA Application 3063210 dated Jul. 19, 2022. (4 pages).
European Examination Report for European Application No. 17908407.4 dated Aug. 2, 2021.
Taiwan First Office Action with English Translation for Taiwan Application No. 107114479 dated Jul. 16, 2021.
Canadian Second Examination Report with English Translation for Canadian Application No. 3,063,210 dated Oct. 6, 2021.
Israel First Office Action for IL Application 270386 dated Aug. 4, 2022. (4 pages).
Singapore Second Written Opinion for SG Application 11201910220Y dated Aug. 30, 2022. (8 pages).

* cited by examiner

100

A terminal device determines at least one target discontinuous reception (DRX) indication signal among multiple DRX indication signals and/or a time-frequency resource position occupied by the at least one target DRX indication signal, wherein the at least one target DRX indication signal is used for instructing the terminal device to perform a target behavior in one DRX cycle after receiving the at least one target DRX indication signal — S110

The terminal device detects a DRX indication signal sent by a network device according to the at least one target DRX indication signal and/or the time-frequency resource position occupied by the at least one target DRX indication signal — S120

A network device determines at least one target discontinuous reception (DRX) indication signal among multiple DRX indication signals and/or a time-frequency resource position occupied by the at least one target DRX indication signal, wherein the at least one target DRX indication signal is used for instructing a terminal device to perform a target behavior in one DRX cycle after receiving the at least one target DRX indication signal — S210

The network device sends one target DRX indication signal of the at least one target DRX indication signal to the terminal device according to the at least one target DRX indication signal and/or the time-frequency resource position occupied by the at least one target DRX indication signal — S220

A network device determines at least one target discontinuous reception (DRX) indication signal among multiple DRX indication signals and/or a time-frequency resource position occupied by the at least one target DRX indication signal, wherein the at least one target DRX indication signal is used for instructing a terminal device to perform a target behavior in one DRX cycle after receiving the at least one target DRX indication signal ~S210

The network device sends one target DRX indication signal of the at least one target DRX indication signal to the terminal device according to the at least one target DRX indication signal and/or the time-frequency resource position occupied by the at least one target DRX indication signal ~S220

The network device determines configuration information, and the configuration information is used for the terminal device to determine the at least one target DRX indication signal and/or the time-frequency resource position occupied by the at least one target DRX indication signal ~S230

The network device sends the configuration information to the terminal device ~S240

METHOD AND DEVICE FOR DISCONTINUOUS RECEPTION

CROSS-REFERENCE TO RELATED APPLICATION(S)

This application is a 371 application of International Application No. PCT/CN2017/083077, filed on May 4, 2017, the entire disclosure of which is hereby incorporated by reference.

TECHNICAL FIELD

Implementations of the present disclosure relate to the field of communications, and more particularly, to a method and a device for discontinuous reception.

BACKGROUND

In order to reduce power consumption of a terminal device, a Discontinuous Reception (DRX) transmission mechanism is introduced into a Long Term Evolution (LTE) system. When there is no data transmission, the terminal device may reduce the power consumption by stopping receiving a Physical Downlink Control Channel (PDCCH), thus improving usage time of a battery. A basic mechanism of DRX is to configure one DRX Cycle for a terminal device in a Radio Resource Control (RRC) Connected state. The DRX Cycle consists of On Duration and Opportunity for DRX: during the time of On Duration, the terminal device monitors and receives a PDCCH, while during the time of Opportunity for DRX, the terminal device does not receive a PDCCH to reduce power consumption.

Although a network side configures a terminal device with a DRX Cycle, the terminal device is only scheduled opportunistically during the periodic time of On Duration, and even when a service load of the terminal device is very low, the terminal device is scheduled only in a few DRX cycles. Therefore, it is unnecessary for the terminal device to monitor a PDCCH during the time of On Duration in all DRX Cycles, which will lead to unnecessary power consumption.

Therefore, it is needed to provide a method for discontinuous reception to reduce power consumption of a terminal device.

SUMMARY

The present disclosure provides a method for discontinuous reception.

In a first aspect, there is provided a method for discontinuous reception, including: determining, by a terminal device, at least one target discontinuous reception (DRX) indication signal among multiple DRX indication signals and/or a time-frequency resource position occupied by the at least one target DRX indication signal, wherein the at least one target DRX indication signal is used for instructing the terminal device to perform a target behavior in one DRX cycle after receiving the at least one target DRX indication signal; and detecting, by the terminal device, a DRX indication signal sent by a network device according to the at least one target DRX indication signal and/or the time-frequency resource position occupied by the at least one target DRX indication signal.

According to the method for Discontinuous Reception of the present disclosure, the terminal device determines at least one target Discontinuous Reception (DRX) indication signal and/or a time-frequency resource position occupied by the at least one target DRX indication signal, and detects a DRX indication signal sent by the network device according to the determined target DRX indication signal or time-frequency resource position occupied by the target DRX indication signal. Thus, a terminal device may perform a target behavior according to an indication of a target DRX indication signal only when detecting that a target DRX indication signal determined by the terminal device itself is included in DRX indication signals sent by a network device.

It should be noted that the target behavior indicated by the target DRX indication signal may be to detect a downlink control channel or not to detect a downlink control channel. Or, in other words, the at least one target DRX indication signal is used for indicating whether the terminal device detects a downlink control channel in one DRX cycle after receiving the at least one target DRX signal.

In combination with the first aspect, in one implementation of the first aspect, the determining the at least one target DRX indication signal among the multiple discontinuous reception DRX indication signals includes: determining the at least one target DRX indication signal according to first characteristic identification information, wherein the first characteristic identification information is used for identifying the terminal device.

In combination with the first aspect and the implementation thereof, in another implementation of the first aspect, the first characteristic identification information includes at least one piece of following information: an identification of the terminal device, an identification of a terminal device group to which the terminal device belongs, a coverage enhancement level of the terminal device, and a network access level of the terminal device.

In combination with the first aspect and the implementation thereof, in another implementation of the first aspect, the determining the at least one target DRX indication signal among the multiple discontinuous reception DRX indication signals includes: determining the at least one target DRX indication signal according to an identification of a cell where the terminal device is located.

In combination with the first aspect and the implementation thereof, in another implementation of the first aspect, the method further includes: determining, by the terminal device, the time-frequency resource position occupied by the at least one target DRX indication signal.

In combination with the first aspect and the implementation thereof, in another implementation of the first aspect, the determining the time-frequency resource position occupied by the at least one target DRX indication signal includes: determining the time-frequency resource position occupied by the at least one target DRX indication signal according to second characteristic identification information, wherein the second characteristic identification information is used for identifying the terminal device.

In combination with the first aspect and the implementation thereof, in another implementation of the first aspect, the second characteristic identification information includes at least one piece of following information: an identification of the terminal device, an identification of a terminal device group to which the terminal device belongs, a coverage enhancement level of the terminal device, and a network access level of the terminal device.

In combination with the first aspect and the implementation, in another implementation of the first aspect, the determining the time-frequency resource position occupied by the at least one target DRX indication signal includes:

determining the time-frequency resource position occupied by the at least one target DRX indication signal according to an identification of a cell where the terminal device is located.

In combination with the first aspect and the implementation thereof, in another implementation of the first aspect, the method further includes: receiving configuration information sent by the network device; wherein the determining the at least one target DRX indication signal among the multiple discontinuous reception DRX indication signals and/or the time-frequency resource position occupied by the at least one target DRX indication signal includes: determining the at least one target DRX indication signal and/or the time-frequency resource position occupied by the at least one target DRX indication signal according to the configuration information.

In combination with the first aspect and the implementation thereof, in another implementation of the first aspect, the receiving the configuration information sent by the network device includes: receiving a radio resource control (RRC) signaling sent by the network device, wherein the RRC signaling includes the configuration information.

In combination with the first aspect and the implementation thereof, in another implementation of the first aspect, the configuration information includes one piece of following information: an identification of the terminal device, an identification of a terminal device group to which the terminal device belongs, an index of the at least one target DRX indication signal, a time-frequency resource position occupied by the at least one target DRX indication signal, and an index of the time-frequency resource position occupied by the at least one target DRX indication signal.

In a second aspect, there is provided a method for discontinuous reception, including: determining, by a network device, at least one target discontinuous reception (DRX) indication signal among multiple DRX indication signals and/or a time-frequency resource position occupied by the at least one target DRX indication signal, wherein the at least one target DRX indication signal is used for instructing the terminal device to perform a target behavior in one DRX cycle after receiving the at least one target DRX indication signal; and sending, by the network device, one target DRX indication signal of the at least one target DRX indication signal to the terminal device according to the at least one target DRX indication signal and/or the time-frequency resource position occupied by the at least one target DRX indication signal.

According to the method for discontinuous reception of the present disclosure, a network device determines at least one target DRX indication signal and/or a time-frequency resource position occupied by the at least one target DRX indication signal, and sends one target DRX indication signal of the at least one target DRX indication signal to a terminal device according to the determined target DRX indication signal and/or time-frequency resource position occupied by the at least one target DRX indication signal. Thus, a terminal device may perform a target behavior according to an indication of a target DRX indication signal only when detecting that a target DRX indication signal determined by the terminal device itself is included in DRX indication signals sent by a network device. It is possible to avoid unnecessary power consumption caused by a terminal device waking up to detect the downlink control channel within On Duration of each DRX cycle.

In combination with the second aspect, in one implementation of the second aspect, the determining the at least one target DRX indication signal among the multiple discontinuous reception DRX indication signals includes: determining the at least one target DRX indication signal according to first characteristic identification information, wherein the first characteristic identification information is used for identifying the terminal device.

In combination with the second aspect and the implementation thereof, in another implementation of the second aspect, the first characteristic identification information includes at least one piece of following information: an identification of the terminal device, an identification of a terminal device group to which the terminal device belongs, a coverage enhancement level of the terminal device, and a network access level of the terminal device.

In combination with the second aspect and the implementation thereof, in another implementation of the second aspect, the determining the at least one target DRX indication signal among the multiple discontinuous reception DRX indication signals includes: determining the at least one target DRX indication signal according to an identification of a cell where the terminal device is located.

In combination with the second aspect and the implementation thereof, in another implementation of the second aspect, the method further includes: determining, by the network device, the time-frequency resource position occupied by the at least one target DRX indication signal.

In combination with the second aspect and the implementation thereof, in another implementation of the second aspect, the determining the time-frequency resource position occupied by the at least one target DRX indication signal includes: determining the time-frequency resource position occupied by the at least one target DRX indication signal according to second characteristic identification information, wherein the second characteristic identification information is used for identifying the terminal device.

In combination with the second aspect and the implementation thereof, in another implementation of the second aspect, the first characteristic identification information and/or the second characteristic identification information includes at least one piece of following information: an identification of the terminal device, an identification of a terminal device group to which the terminal device belongs, a coverage enhancement level of the terminal device, and a network access level of the terminal device.

In combination with the second aspect and the implementation, in another implementation of the second aspect, the determining the time-frequency resource position occupied by the at least one target DRX indication signal includes: determining the time-frequency resource position occupied by the at least one target DRX indication signal according to an identification of a cell where the terminal device is located.

In combination with the second aspect and the implementation thereof, in another implementation of the second aspect, the method further includes: determining, by the network device, configuration information, wherein the configuration information is used for the terminal device to determine the at least one target DRX indication signal and/or the time-frequency resource position occupied by the at least one target DRX indication signal; and sending, by the network device, the configuration information to the terminal device.

In combination with the second aspect and the implementation thereof, in another implementation of the second aspect, the sending the configuration information to the terminal device includes: sending a radio resource control (RRC) signaling to the terminal device, wherein the RRC signaling includes the configuration information.

In combination with the second aspect and the implementation thereof, in another implementation of the second aspect, the configuration information includes one piece of following information: an identification of the terminal device, an identification of a terminal device group to which the terminal device belongs, an index of the at least one target DRX indication signal, a time-frequency resource position occupied by the at least one target DRX indication signal, and an index of the time-frequency resource position occupied by the at least one target DRX indication signal.

In a third aspect, a terminal device is provided, which is used for performing the method in the above first aspect or any possible implementation of the first aspect. Specifically, the terminal device includes function modules used for executing the method in the first aspect or any possible implementation of the first aspect described above.

In a fourth aspect, a network device is provided, which is used for performing the method in the above second aspect or any possible implementation of the second aspect. Specifically, the network device includes function modules for executing the method in the second aspect or in any possible implementation of the second aspect described above.

In a fifth aspect, a terminal device is provided, which includes a processor, a memory, and a transceiver. The processor, the memory, and the transceiver communicate with each other through internal connection paths to transfer control and/or data signals, so that the terminal device implements the method in the first aspect or any possible implementation of the first aspect described above.

In a sixth aspect, a network device is provided, which includes a processor, a memory, and a transceiver. The processor, the memory, and the transceiver communicate with each other through internal connection paths to transfer control and/or data signals, so that the network device implements the method in the second aspect or any possible implementation of the second aspect described above.

In a seventh aspect, a computer readable medium is provided for storing a computer program. The computer program includes instructions used for implementing the method of the first aspect or any possible implementation of the first aspect.

In an eighth aspect, a computer readable medium is provided for storing a computer program. The computer program includes instructions used for implementing the method of the second aspect or any possible implementation of the second aspect.

DETAILED DESCRIPTION

Technical schemes in implementations of the present disclosure will be clearly and completely described below with reference to the drawings in the implementations of the present disclosure.

It should be understood that technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS) system, a Worldwide Interoperability for Microwave Access (WiMAX) communication system, a 5G system, or a New Radio (NR) System.

In the implementations of the present disclosure, a terminal device may include, but not limited to, a Mobile Station (MS), a mobile terminal, a mobile telephone, User Equipment (UE), a handset, a portable equipment, a vehicle, and so on. A terminal device may communicate with one or more core networks through a radio access network (RAN). For example, the terminal device can be a mobile telephone (or called as cellular phone), a computer with wireless communication function and the like. The terminal device can also be a portable, pocket-size, handheld, computer built-in or vehicle-mounted mobile apparatus.

The network device involved in the implementations of the present disclosure is an apparatus deployed in a wireless access network to provide wireless communication functions for a terminal device. The network device may be a base station, which may include various forms of macro base stations, micro base stations, relay stations, access points, etc. In systems adopting different radio access technologies, name of a device with base station function may be different. For example, in a LTE network, it is called evolved node B (eNB or eNodeB), and in 3rd Generation (3G) network, it is called node B, etc. The network device may be a core network device.

In a LTE system, in order to reduce power consumption of a terminal device, a Discontinuous Reception (DRX) transmission mechanism is proposed. A network device configures a DRX Cycle for a terminal device. The DRX Cycle consists of On Duration and Opportunity for DRX: during the time of On Duration, the terminal device monitors and receives a PDCCH, while during the time of Opportunity for DRX, the terminal device does not receive a PDCCH to reduce power consumption. Although the network device configures the terminal device with a DRX mechanism, the terminal device is only scheduled opportunistically during the periodic time of On Duration, and even when a service load of the terminal device is very low, the terminal device is scheduled only in a few DRX Cycles. There is room for further optimization.

In a related art, if a network device needs to schedule a terminal device within the time of On Duration in a DRX Cycle, the network device sends an indication signal, such as a wake-up signal, to the terminal device before the DRX Cycle for waking up the terminal device, otherwise the indication signal will not be sent to the terminal device. The terminal device wakes up after detecting the wake-up signal and performs a Physical Downlink Control Channel (PDCCH) detection and data reception within the time of On Duration of the DRX Cycle. However, if multiple terminal devices have the same DRX Cycle, the possibility that the multiple terminal devices simultaneously receive scheduling of a network device during the time of On Duration is very small. If a method in the related art is adopted, a network device sends the same indication signal to the multiple terminal devices before the DRX Cycle, and the multiple terminal devices wake up to perform a PDCCH detection during the time of On Duration after receiving the indication signal, unnecessary power consumption will be generated for the terminal devices without data transmission.

In order to solve the problem, the present disclosure provides a method for discontinuous reception, which may reduce power consumption of terminal devices.

Figure 1:
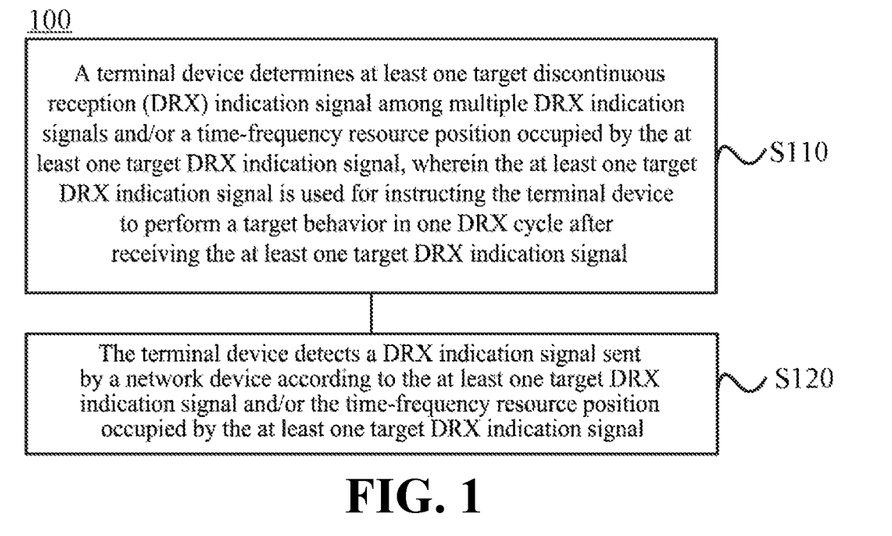
FIG. 1 is a schematic flow chart of a method for discontinuous reception according to an implementation of the present disclosure.

FIG. 1 shows a method for discontinuous reception according to an implementation of the present disclosure. As shown in FIG. 1, the method 100 includes acts S110 and S120.

In S110, a terminal device determines at least one target discontinuous reception (DRX) indication signal among multiple DRX indication signals and/or a time-frequency resource position occupied by the at least one target DRX indication signal, wherein the at least one target DRX indication signal is used for instructing the terminal device to perform a target behavior in one DRX cycle after receiving the at least one target DRX indication signal.

In S120: the terminal device detects a DRX indication signal sent by a network device according to the at least one target DRX indication signal and/or the time-frequency resource position occupied by the at least one target DRX indication signal.

Specifically, if the terminal device only determines at least one target DRX indication signal in S110, the terminal device and the network device may pre-agree on a time-frequency resource position for transmitting a DRX indication signal, the terminal device detects DRX indication signal transmitted by the network device at the agreed time-frequency resource position in S120, and when the target DRX indication signal is detected, the target behavior is executed according to an indication of the target DRX indication signal. Or, if the terminal device only determines the time-frequency resource position occupied by at least one target DRX indication signal in S110, the terminal device detects DRX indication signal transmitted by the network device at the determined time-frequency resource position in S120, and if the DRX indication signal transmitted by the network device is detected, the target behavior is executed according to the DRX indication signal. Or if the terminal device determines the at least one target DRX indication signal and the time-frequency resource position occupied by the at least one target DRX indication signal in S110, the terminal device detects a signal transmitted by the network device at the determined time-frequency resource position occupied by the at least one target DRX indication signal in S120, and if a target DRX indication signal in the at least one target DRX indication signal is detected, the terminal device performs the target behavior according to an indication of the target DRX indication signal.

Optionally, in S110, the terminal device determines the at least one target DRX indication signal according to first characteristic identification information, wherein the first characteristic identification information is used for identifying the terminal device. Here, the first characteristic identification information includes at least one piece of following information: an identification of the terminal device, an identification of a terminal device group to which the terminal device belongs, a coverage enhancement level of the terminal device, and a network access level of the terminal device.

For example, a terminal device may determine a target DRX indication signal according to an identification of the terminal device. For example, a terminal device determines a target indication signal according to a temporary mobile subscriber identity (TMSI) and a correspondence between the TMSI and a DRX indication signal, or the terminal device obtains a remainder after a TMSI modulo a numerical value N, and the terminal device determines a target DRX indication signal according to the obtained remainder and a correspondence between numerical values and DRX indication signals. Taking a candidate set of DRX indication signals being an orthogonal sequence set as an example, identifications of different terminal devices correspond to different orthogonal sequence numbers, and a terminal device may determine an orthogonal sequence of a target DRX indication signal from the orthogonal sequence set according to a remainder value obtained after a TMSI modulo a numerical value N. Or, a DRX indication signal is a Zadoff-Chu (ZC) sequence, and identifications of different terminal devices correspond to different sequence cyclic shift values. A terminal device may determine a cyclic shift value of a ZC sequence corresponding to a target DRX indication signal according to a remainder obtained after a TMSI modulo N.

Or, a terminal device determines a target DRX indication signal according to an identification of a terminal device group to which the terminal device belongs. For example, a remainder is obtained from the identification of the terminal device group modulo a numerical value N, and then the terminal device determines a target DRX indication signal according to the obtained remainder and a correspondence between numerical values and DRX indication signals. Or, coverage enhancement levels may be divided into M types, and the terminal device determines a target DRX indication signal according to its own coverage enhancement level and a correspondence between coverage enhancement levels and DRX indication signals. Or, the operator may set L types of network access levels, different terminal devices have determined network access levels when signing contracts with the operator, the network access levels are solidified in Subscriber Identification Module (SIM) cards, and a terminal device determine a target DRX indication signal according to a network access level and a correspondence between network access levels and DRX indication signals.

It may be understood that values of the N and the M may be notified through a signaling to a terminal device by a network device, for example, through a broadcast signaling. Or the values of the N and the M may be pre-agreed by the terminal device and the network device. The correspondence may be pre-agreed by the terminal device and the network device, or may be notified to the terminal device through a signaling by the network device.

Optionally, in S110, the terminal device determines the at least one target DRX indication signal according to an identification of a cell where the terminal device is located. For example, DRX indication signals of different cells are scrambled with scrambling codes related to cell Identifications (IDs). The terminal device determines a scrambling code of a target indication signal according to the ID of the cell where the terminal device is located and a correspondence between cell IDs and scrambling codes. For another example, subsets of different DRX indication signals are allocated to different cells based on cell IDs. For example, the aforementioned orthogonal sequence set is divided into K orthogonal codeword subsets, and different subsets are selected for different cells. The terminal device may determine a specific orthogonal codeword subset based on a cell ID, and then determine an orthogonal codeword of a target DRX indication signal from the determined orthogonal codeword subset according to the identification of the terminal device.

Optionally, in S110, the terminal device determines the time-frequency resource position occupied by the at least one target DRX indication signal according to second characteristic identification information, which is used for identifying the terminal device. Here, the second characteristic identification information includes at least one piece of following information: an identification of the terminal device, an identification of a terminal device group to which the terminal device belongs, a coverage enhancement level of the terminal device, and a network access level of the terminal device.

For example, the terminal device may determine the time-frequency resource position occupied by the target DRX indication signal according to the identification of the terminal device, for example, a remainder is obtained from a Temporary Mobile Subscriber Identity (TMSI) of the terminal device modulo a numerical value N, and then a time-frequency resource position occupied by a target DRX indication signal is determined according to the obtained remainder and a correspondence between numerical values and time-frequency resource positions. Or the terminal device determines a time-frequency resource position occupied by a target DRX indication signal according to the identification of the terminal device group to which the terminal device belongs. For example, a remainder is obtained from the identification of the terminal device group modulo a numerical value N, and then the terminal device determines a target DRX indication signal according to the obtained remainder and a correspondence between numerical values and time-frequency resource positions. Or, coverage enhancement levels may be divided into M types, and the terminal device determines a time-frequency resource position occupied by a target DRX indication signal according to its own coverage enhancement level and a correspondence between coverage enhancement levels and time-frequency resource positions. Or, the operator may set L types of network access levels, different terminal devices have determined network access levels when signing contracts with the operator, the network access levels are solidified in SIM cards, and a terminal device determine a time-frequency resource position occupied by a target DRX indication signal according to a network access level and a correspondence between network access levels and time-frequency resource positions.

It may be understood that values of the N and the M may be notified through a signaling to a terminal device by a network device, for example, through a broadcast signaling. Or the values of the N and the M may be pre-agreed by the terminal device and the network device. The correspondence may be pre-agreed by the terminal device and the network device, or may be notified to the terminal device through a signaling by the network device.

Optionally, in S110, the terminal device determines the time-frequency resource position occupied by at least one target DRX indication signal according to the identification of the cell where the terminal device is located. For example, different cell identifications correspond to different time-frequency resource positions, and the terminal device determines a time-frequency resource position occupied by a target DRX indication signal according to an identification of a cell where the terminal device is located and a correspondence between cell identifications and time-frequency resource positions. Or, time-frequency resource positions that may be used for transmitting DRX indication signals are divided into multiple sub-time-frequency resource position sets, the terminal device determines a sub-time-frequency resource position set corresponding to a cell according to an identification of a cell where the terminal device is located, and then the terminal device determines a time-frequency resource position occupied by a target DRX indication signal from the determined sub-time-frequency resource position set according to an identification of the terminal device.

Optionally, before S110, the terminal device receives configuration information sent by the network device, and in S110, the terminal device determines the at least one target DRX indication signal and/or the time-frequency resource position occupied by the at least one target DRX indication signal according to the received configuration information.

Optionally, in some implementations, configuration information includes one piece of following information: an identification of the terminal device, an identification of a terminal device group to which the terminal device belongs, an index of the at least one target DRX indication signal, a time-frequency resource position occupied by the at least one target DRX indication signal, and an index of the time-frequency resource position occupied by the at least one target DRX indication signal.

It should be noted that if the configuration information includes the identification of the terminal device or the identification of the terminal device group to which the terminal device belongs, the method for the terminal device to determine at least one target DRX indication signal and/or a time-frequency resource position occupied by the at least one target DRX indication signal is the same as the method described above, and in order to avoid repetition, it will not be repeated here.

It should also be noted that the index of the at least one target DRX indication signal, the time-frequency resource position occupied by the at least one target DRX indication signal, and the index of the time-frequency resource position occupied by the at least one target DRX indication signal may be for one terminal device or for one terminal device group.

Specifically, in some implementations, the network device sends a Radio Resource Control (RRC) signaling to the terminal device, and the RRC signaling includes the configuration information.

It may be understood that the method for the terminal device to determine the at least one target DRX indication signal and/or the time-frequency resource position occupied by the at least one target DRX indication channel according to the configuration information is suitable for a case where the terminal device is in an RRC connection state. In this case, the network device may configure a target DRX indication signal and/or a time-frequency resource position occupied by the target DRX indication signal for the terminal device according to information such as service characteristics of the terminal device, a transmission delay requirement, a network load condition, etc.

In all the implementations, a terminal device may obtain two or more target DRX indication signals and/or time-frequency resource positions occupied by two or more target DRX indication signals, and the terminal device needs to detect DRX indication signals sent by a network device according to the two or more target DRX indication signals and/or the time-frequency resource positions occupied by the two or more target DRX indication signals. For example, a terminal device determines a first target DRX indication signal and/or a time-frequency resource position occupied by the first target DRX indication signal according to an identification of the terminal device, the terminal device determines a second target DRX indication signal and/or a time-frequency resource position occupied by the second target DRX indication signal according to an identification of a terminal device group to which the terminal device belongs, or a second target DRX indication signal and/or a time-frequency resource position occupied by the second target DRX indication signal is configured by a network device for the terminal device or is pre-agreed by the terminal device and the network device. The terminal device needs to detect DRX indication signals sent by the network device according to the first target DRX indication signal and/or the time-frequency resource position occupied by the first target DRX indication signal, and the second target DRX indication signal and/or the time-frequency resource position occupied by the second target DRX indication signal.

Therefore, when determining a DRX indication signal to be sent to a terminal device, a network device may determine a target DRX indication signal to be sent to the terminal device according to scheduling conditions of multiple terminal devices having the same DRX cycle. For example, if all or most of terminal devices among the multiple terminal devices need to be scheduled, the network device sends a target DRX indication signal for the multiple terminal devices to the multiple terminal devices, which is beneficial to saving sequence occupation and time-frequency resource overhead. If only a very small quantity of the multiple terminal devices need to be scheduled, the network device sends a target DRX indication signal for each of the terminal devices that need to be scheduled to the each of the terminal devices (for example, sends a target DRX indication signal determined according to an identification of each terminal device to the each terminal device), which is beneficial to improving an efficiency of controlling a terminal device to perform DRX.

Or, a network device may divide multiple terminal devices having the same DRX cycle into multiple terminal device groups. For example, a network device may divide terminal devices with similar service transmission periods or service types into a terminal device group. In this case, when determining a DRX indication signal to be sent to a terminal device, a network device may determine a target DRX indication signal to be sent to the terminal device according to scheduling conditions of the terminal devices in the terminal device group. For example, if all or most of terminal devices in the terminal device group need to be scheduled, the network device sends a target DRX indication signal determined according to an identification of the terminal device group to all the terminal devices in the terminal device group, which may increase a probability that terminal devices in the same terminal device group simultaneously detect DRX indication signals in a DRX cycle. If only a few terminal devices in the terminal device group need to be scheduled, the network device sends a target DRX indication signal determined according to an identification of a terminal device that needs to be scheduled to the terminal device, which is beneficial to improving an efficiency of controlling a terminal device to perform DRX.

The method for discontinuous reception according to the implementation of the present disclosure is described in detail from a terminal device side above with reference to FIG. 1, and the method for discontinuous reception according to the implementation of the present disclosure will be described in detail from a network device side with reference to FIG. 2. It should be understood that interactions between a network device and a terminal device described from the network device side is the same as that described from the terminal device side, and relevant descriptions are omitted appropriately to avoid repetition.

Figure 2:
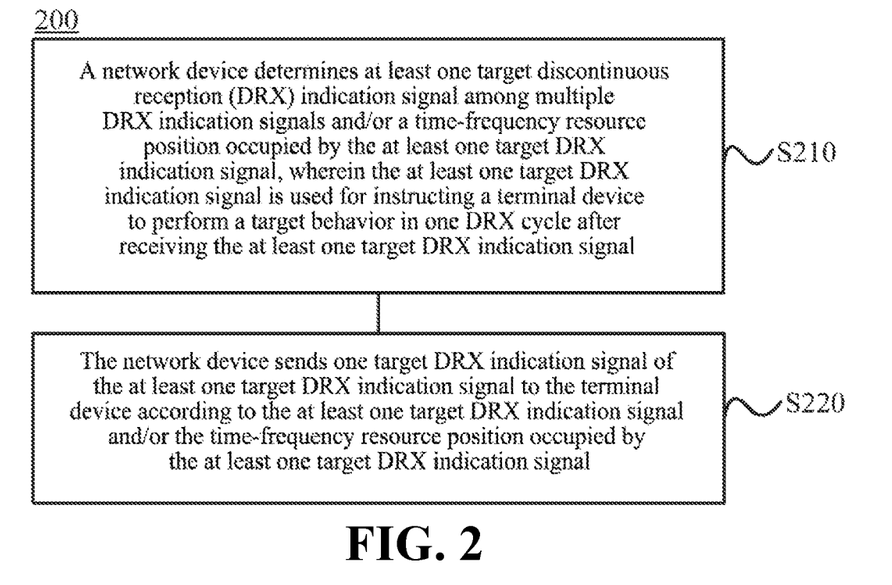
FIG. 2 is a schematic flow chart of a method for discontinuous reception according to another implementation of the present disclosure.

FIG. 2 shows a method for discontinuous reception according to another implementation of the present disclosure. As shown in FIG. 2, the method 200 includes acts S210 and S220.

In S210, a network device determines at least one target discontinuous reception (DRX) indication signal among multiple DRX indication signals and/or a time-frequency resource position occupied by the at least one target DRX indication signal, wherein the at least one target DRX indication signal is used for instructing a terminal device to perform a target behavior in one DRX cycle after receiving the at least one target DRX indication signal.

In S220, the network device sends one target DRX indication signal of the at least one target DRX indication signal to the terminal device according to the at least one target DRX indication signal and/or the time-frequency resource position occupied by the at least one target DRX indication signal.

Therefore, according to the method for discontinuous reception of the present disclosure, a network device determines at least one target DRX indication signal and/or a time-frequency resource position occupied by the at least one target DRX indication signal, and sends one target DRX indication signal of the at least one target DRX indication signal to a terminal device according to the determined target DRX and/or time-frequency resource position occupied by the at least one target DRX. Thus, a terminal device may perform a target behavior according to an indication of a target DRX indication signal only when detecting that a target DRX indication signal determined by the terminal device itself is included in DRX indication signals sent by a network device. It is possible to avoid unnecessary power consumption caused by a terminal device waking up to detect the downlink control channel within On Duration of each DRX cycle. In addition, a network device can realize transmission of an indication signal at a terminal device level or a terminal device group level, so that the network device can carry out fine DRX control on a terminal device according to possible scheduling conditions of the terminal device during On Duration, and further reduce power consumption of the terminal device.

Specifically, if a network device only determines at least one target DRX indication signal in S210, a terminal device and a network device may pre-agree on a time-frequency resource position for transmitting a DRX indication signal, and the network device transmits one target DRX indication signal of the at least one target DRX indication signal to the terminal device at the pre-agreed time-frequency resource position in S220. Or, if a network device only determines a time-frequency resource position occupied by at least one target DRX indication signal in S210, the network device sends a target DRX indication signal to a terminal device in S220 at a time-frequency resource position occupied by one target DRX indication signal of the time-frequency resource position occupied by the at least one target DRX indication signal. Or, if a network device determines at least one target DRX indication signal and a time-frequency resource position occupied by the at least one target DRX indication signal in S210, the network device sends a target DRX indication signal to a terminal device at a time-frequency resource position occupied by the determined one target DRX indication signal in S220.

In the implementation of the present disclosure, optionally, the act S210 includes: determining the at least one DRX indication signal according to first characteristic identification information, wherein the first characteristic identification information is used for identifying the terminal device.

In the implementation of the present disclosure, optionally, the first characteristic identification information includes at least one piece of following information: an identification of the terminal device, an identification of a terminal device group to which the terminal device belongs, a coverage enhancement level of the terminal device, and a network access level of the terminal device.

In the implementation of the present disclosure, optionally, the act S210 includes: determining the at least one target DRX indication signal according to an identification of a cell where the terminal device is located.

In the implementation of the present disclosure, optionally, the act S210 includes: the network device determines a time-frequency resource position occupied by the at least one target DRX indication signal.

In the implementation of the present disclosure, optionally, the act S210 includes: determining a time-frequency resource position occupied by the at least one target DRX indication signal according to second characteristic identification information, wherein the second characteristic identification information is used for identifying the terminal device.

In the implementation of the present disclosure, optionally, the second characteristic identification information includes at least one piece of following information: an identification of the terminal device, an identification of a terminal device group to which the terminal device belongs, a coverage enhancement level of the terminal device, and a network access level of the terminal device.

In the implementation of the present disclosure, optionally, the act S210 includes: determining a time-frequency resource position occupied by the at least one target DRX indication signal according to an identification of a cell where the terminal device is located.

Figure 3:
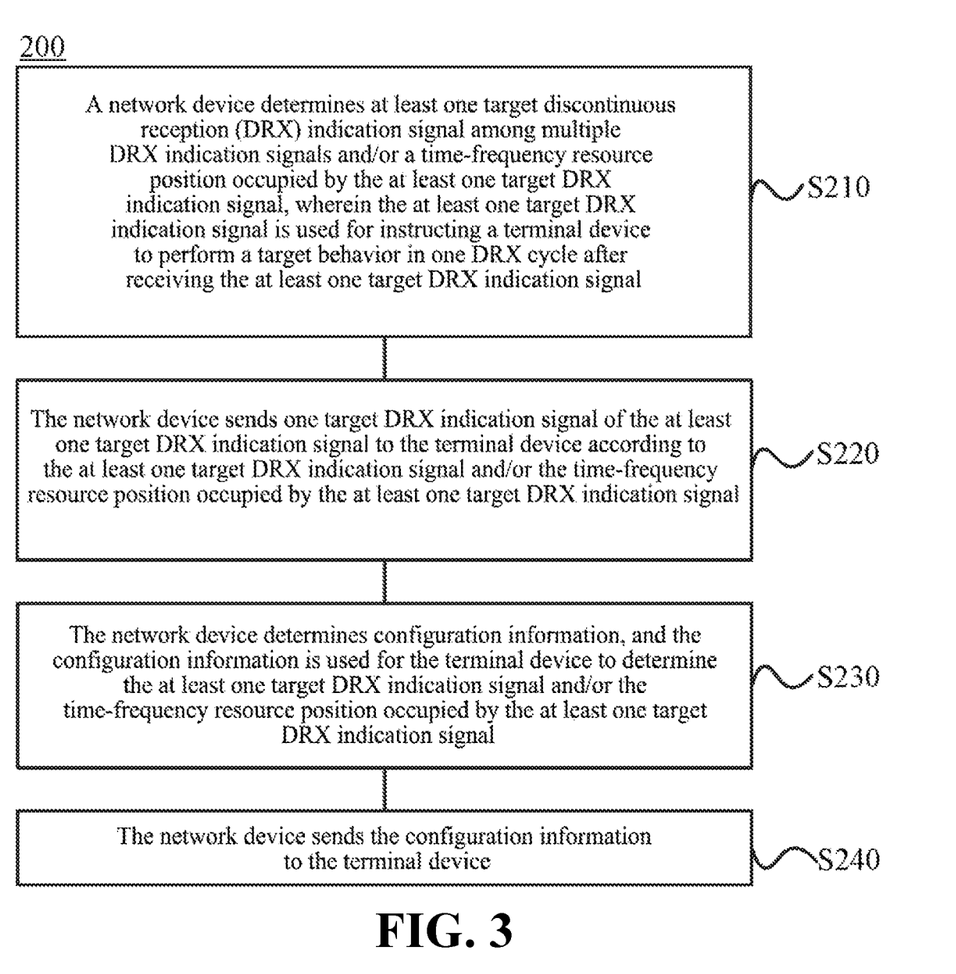
FIG. 3 is another schematic flow chart of a method for discontinuous reception according to another implementation of the present disclosure.

In the implementation of the present disclosure, optionally, as shown in FIG. 3, the method 200 further includes acts S230 and S240.

In S230, the network device determines configuration information, and the configuration information is used for the terminal device to determine the at least one target DRX indication signal and/or the time-frequency resource position occupied by the at least one target DRX indication signal.

In S240, the network device sends the configuration information to the terminal device.

In the implementation of the present disclosure, optionally, the act S240 includes: sending a radio resource control (RRC) signaling to the terminal device, wherein the RRC signaling includes the configuration information.

In the implementation of the present disclosure, the configuration information includes one piece of following information: an identification of the terminal device, an identification of a terminal device group to which the terminal device belongs, an index of the at least one target DRX indication signal, a time-frequency resource position occupied by the at least one target DRX indication signal, and an index of the time-frequency resource position occupied by the at least one target DRX indication signal.

Figure 4:
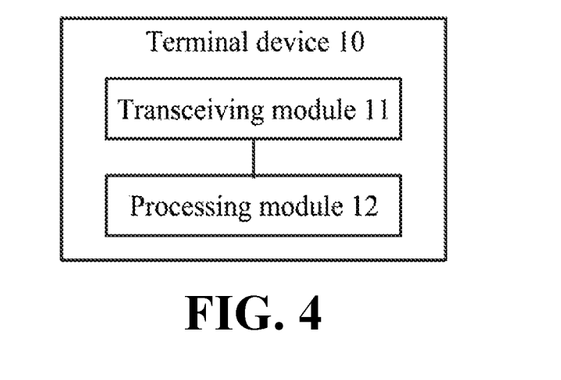
FIG. 4 is a schematic block diagram of a terminal device according to an implementation of the present disclosure.

The method for discontinuous reception according to the implementation of the present disclosure has been described in detail above with reference to FIGS. 1 to 3. A terminal device according to an implementation of the present disclosure will be described in detail below with reference to FIG. 4. As shown in FIG. 4, a terminal device 10 includes a transceiving module 11 and a processing module 12.

The processing module 12 is used for determining at least one target discontinuous reception (DRX) indication signal among multiple DRX indication signals and/or a time-frequency resource position occupied by the at least one target DRX indication signal, and the at least one target DRX indication signal is used for instructing the processing module 12 to perform a target behavior in one DRX cycle after the transceiving module 11 receives the at least one target DRX indication signal.

The processing module 12 is further used for detecting a DRX indication signal sent by a network device according to the at least one target DRX indication signal and/or the time-frequency resource position occupied by the at least one target DRX indication signal.

Therefore, a terminal device according to the implementation of the present disclosure determines at least one target DRX indication signal and/or a time-frequency resource position occupied by the at least one target DRX indication signal, and detects a DRX indication signal transmitted by a network device according to a determined target DRX indication signal and/or time-frequency resource position occupied by a target DRX indication signal. Thus, a terminal device may perform a target behavior according to an indication of a target DRX indication signal only when detecting that a target DRX indication signal determined by the terminal device itself is included in DRX indication signals sent by a network device. It is possible to avoid unnecessary power consumption caused by a terminal device waking up to detect the downlink control channel within On Duration of each DRX cycle.

In the implementation of the present disclosure, optionally, the processing module 12 is specifically used for determining the at least one target DRX indication signal according to first characteristic identification information, which is used for identifying the terminal device.

In the implementation of the present disclosure, optionally, the first characteristic identification information includes at least one piece of following information: an identification of the terminal device, an identification of a terminal device group to which the terminal device belongs, a coverage enhancement level of the terminal device, and a network access level of the terminal device.

In the implementation of the present disclosure, optionally, the processing module 12 is specifically used for determining the at least one target DRX indication signal according to an identification of a cell where the terminal device is located.

In the implementation of the present disclosure, optionally, the processing module 12 is further used for determining a time-frequency resource position occupied by the at least one target DRX indication signal.

In the implementation of the present disclosure, optionally, the processing module 12 is specifically used for determining a time-frequency resource position occupied by the at least one target DRX indication signal according to second characteristic identification information, wherein the second characteristic identification information is used for identifying the terminal device.

In the implementation of the present disclosure, optionally, the second characteristic identification information includes at least one piece of following information: an identification of the terminal device, an identification of a terminal device group to which the terminal device belongs, a coverage enhancement level of the terminal device, and a network access level of the terminal device.

In the implementation of the present disclosure, optionally, the processing module 12 is specifically used for determining a time-frequency resource position occupied by the at least one target DRX indication signal according to an identification of a cell where the terminal device is located.

In an implementation of the present disclosure, optionally, the transceiving module 11 is further used for receiving configuration information sent by the network device.

The processing module 12 is specifically used for determining the at least one target DRX indication signal and/or the time-frequency resource position occupied by the at least one target DRX indication signal according to the configuration information.

In the implementation of the present disclosure, optionally, the transceiving module 11 is specifically used for receiving a radio resource control (RRC) signaling sent by the network device, and the RRC signaling includes the configuration information.

In the implementation of the present disclosure, the configuration information includes one piece of following information: an identification of the terminal device, an identification of a terminal device group to which the terminal device belongs, an index of the at least one target DRX indication signal, a time-frequency resource position occupied by the at least one target DRX indication signal, and an index of the time-frequency resource position occupied by the at least one target DRX indication signal.

The terminal device according to implementation of the present disclosure may refer to the flow of the method 100 corresponding to the implementation of the present disclosure, and various units/modules in the terminal device and other operations and/or functions described above are respectively for realizing the corresponding flow in the method 100, and will not be repeated herein for brevity.

Figure 5:
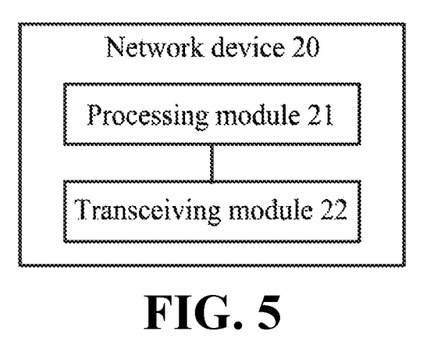
FIG. 5 is a schematic block diagram of a network device according to an implementation of the present disclosure.

FIG. 5 shows a network device according to an implementation of the present disclosure, as shown in FIG. 5, the network device 20 includes a processing module 21 and a transceiving module 22.

The processing module 21 is used for determining at least one target discontinuous reception (DRX) indication signal among multiple DRX indication signals and/or a time-frequency resource position occupied by the at least one target DRX indication signal, wherein the at least one target DRX indication signal is used for instructing a terminal device to perform a target behavior in one DRX cycle after receiving the at least one target DRX indication signal.

The transceiving module 22 is used for sending one of the at least one target DRX indication signal to the terminal device according to the at least one target DRX indication signal and/or the time-frequency resource position occupied by the at least one target DRX indication signal.

Therefore, the network device according to the implementation of the present disclosure determines at least one target DRX indication signal and/or a time-frequency resource position occupied by the at least one target DRX indication signal, and sends one target DRX indication signal of the at least one target DRX indication signal to a terminal device according to the determined target DRX and/or time-frequency resource position occupied by the at least one target DRX. Thus, a terminal device may perform a target behavior according to an indication of a target DRX indication signal only when detecting that a target DRX indication signal determined by it is included in DRX indication signals sent by a network device. It is possible to avoid unnecessary power consumption caused by a terminal device waking up to detect the downlink control channel within On Duration of each DRX cycle. In addition, a network device can realize transmission of an indication signal at a terminal device level or a terminal device group level, so that the network device can carry out fine DRX control on a terminal device according to possible scheduling conditions of the terminal device during On Duration, and further reduce power consumption of the terminal device.

In the implementation of the present disclosure, optionally, the processing module 21 is specifically used for determining the at least one target DRX indication signal according to first characteristic identification information, wherein the first characteristic identification information is used for identifying the terminal device.

In the implementation of the present disclosure, optionally, the first characteristic identification information includes at least one piece of following information: an identification of the terminal device, an identification of a terminal device group to which the terminal device belongs, a coverage enhancement level of the terminal device, and a network access level of the terminal device.

In the implementation of the present disclosure, optionally, the processing module 21 is specifically used for determining the at least one target DRX indication signal according to an identification of a cell where the terminal device is located.

In the implementation of the present disclosure, optionally, the processing module 21 is further used for determining a time-frequency resource position occupied by the at least one target DRX indication signal.

In the implementation of the present disclosure, optionally, the processing module 21 is specifically used for determining a time-frequency resource position occupied by the at least one target DRX indication signal according to second characteristic identification information, and the second characteristic identification information is used for identifying the terminal device.

In the implementation of the present disclosure, optionally, the second characteristic identification information includes at least one piece of following information: an identification of the terminal device, an identification of a terminal device group to which the terminal device belongs, a coverage enhancement level of the terminal device, and a network access level of the terminal device.

In the implementation of the present disclosure, optionally, the processing module 21 is specifically used for determining a time-frequency resource position occupied by the at least one target DRX indication signal according to an identification of a cell where the terminal device is located.

In the implementation of the present disclosure, the processing module 21 is optionally further used for determining configuration information, and the configuration information is used for the terminal device to determine the at least one target DRX indication signal and/or the time-frequency resource position occupied by the at least one target DRX indication signal.

The transceiving module 22 is further used for sending the configuration information to the terminal device.

In the implementation of the present disclosure, optionally, the transceiving module 22 is specifically used for sending a radio resource control (RRC) signaling to the terminal device, and the RRC signaling includes the configuration information.

In the implementation of the present disclosure, the configuration information includes one piece of following information: an identification of the terminal device, an identification of a terminal device group to which the terminal device belongs, an index of the at least one target DRX indication signal, a time-frequency resource position occupied by the at least one target DRX indication signal, and an index of the time-frequency resource position occupied by the at least one target DRX indication signal.

The network device according to the implementation of the present disclosure may refer to a flow of the method 200 corresponding to the implementation of the present disclosure, and various units/modules in the network device and the other operations and/or functions are respectively in order to realize the corresponding flow in the method 200, and will not be repeated here for brevity.

Figure 6:
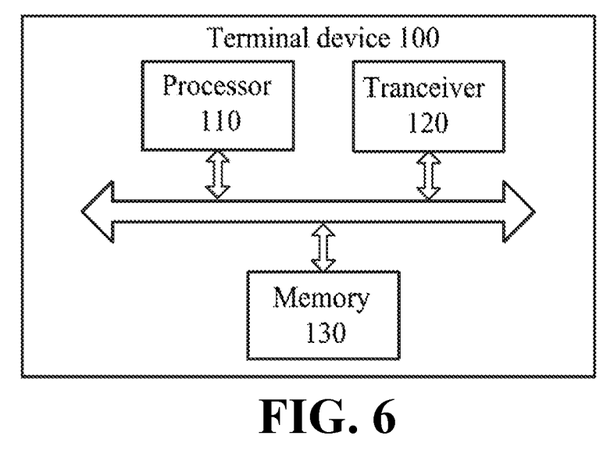
FIG. 6 is a schematic block diagram of a terminal device according to another implementation of the present disclosure.

FIG. 6 shows a terminal device according to another implementation of the present disclosure. As shown in FIG. 6, the terminal device 100 includes a processor 110 and a transceiver 120, and the processor 110 is connected to the transceiver 120. Optionally, the terminal device 100 further includes a memory 130, and the memory 130 is connected to the processor 110. Herein, the processor 110, the memory 130, and the transceiver 120 may communicate with each other through an internal connection path. The processor 110 is used for determining at least one target discontinuous reception (DRX) indication signal among multiple DRX indication signals and/or a time-frequency resource position occupied by the at least one target DRX indication signal, and the at least one target DRX indication signal is used for instructing the processor 110 to perform a target behavior in one DRX cycle after the transceiver 120 receives the at least one target DRX indication signal. The processor 110 is further used for detecting a DRX indication signal sent by a network device according to the at least one target DRX indication signal and/or the time-frequency resource position occupied by the at least one target DRX indication signal.

Therefore, a terminal device according to the implementation of the present disclosure determines at least one target DRX indication signal and/or a time-frequency resource position occupied by the at least one target DRX indication signal, and detects a DRX indication signal transmitted by a network device according to a determined target DRX and/or time-frequency resource position occupied by a target DRX indication signal. Thus, a terminal device may perform a target behavior according to an indication of a target DRX indication signal only when detecting that a target DRX indication signal determined by the terminal device itself is included in DRX indication signals sent by a network device. It is possible to avoid unnecessary power consumption caused by a terminal device waking up to detect the downlink control channel within On Duration of each DRX cycle.

The terminal device 100 according to the implementation of the present disclosure may refer to the terminal device 10 corresponding to the implementation of the present disclosure, and various units/modules in the terminal device and other operations and/or functions described above are respectively for realizing the corresponding flow in the method 100, and will not be repeated here for brevity.

Figure 7:
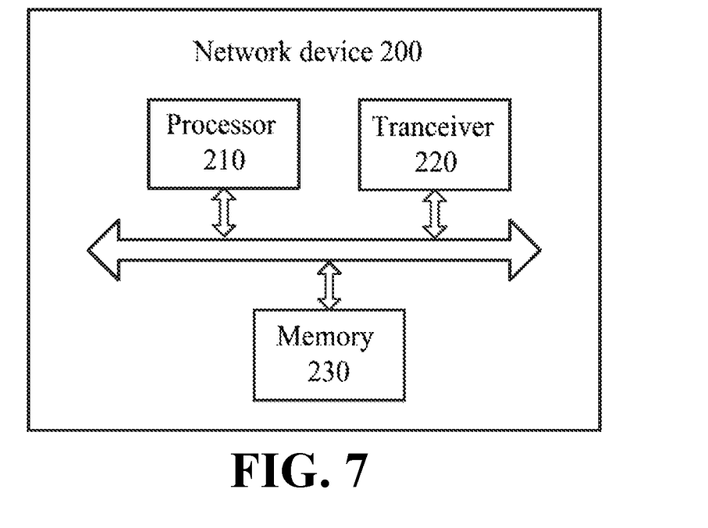
FIG. 7 is a schematic block diagram of a network device according to another implementation of the present disclosure.

FIG. 7 shows a schematic block diagram of a network device according to another implementation of the present disclosure. As shown in FIG. 7, a network device 200 includes a processor 210 and a transceiver 220, the processor 210 and the transceiver 220 are connected, and optionally, the network device 200 further includes a memory 230 connected to the processor 210. Herein, the processor 210, the memory 230, and the transceiver 220 may communicate with each other through an internal connection path. The processor 210 is used for determining at least one target discontinuous reception (DRX) indication signal among multiple DRX indication signals and/or a time-frequency resource position occupied by the at least one target DRX indication signal, wherein the at least one target DRX indication signal is used for instructing a terminal device to perform a target behavior in one DRX cycle after receiving the at least one target DRX indication signal. The transceiver 220 is used for sending one of the at least one target DRX indication signal to the terminal device according to the at least one target DRX indication signal and/or the time-frequency resource position occupied by the at least one target DRX indication signal.

The network device 200 according to the implementation of the present disclosure may refer to the network device 20 corresponding to the implementation of the present disclosure, and various units/modules in the network device and other operations and/or functions described above are respectively for realizing the corresponding flow in the method 200, and will not be repeated here for brevity.

The network device 200 according to the implementation of the present disclosure may refer to the network device 20 corresponding to the implementation of the present disclosure, and various units/modules in the network device and other operations and/or functions described above are respectively for realizing the corresponding flow in the method 200, and will not be repeated here for brevity.

It should be understood that the processor in an implementation of the present disclosure may be an integrated circuit chip with a capability for processing signals. In the implementation process, the actions of the method implementations described above may be completed by integrated logic circuits of hardware in the processor or instructions in the form of software. The above processor may be a general purpose processor, a digital signal processor (DSP), an application specific integrated circuit (ASIC), a field programmable gate array (FPGA), or other programmable logic device, discrete gate or transistor logic device, or discrete hardware component. The processor may implement various methods, acts and logic block diagrams disclosed in implementations of the present disclosure. The general purpose processor may be a microprocessor or the processor may be any conventional processor or the like. The actions of the method disclosed in connection with the implementation of the present disclosure may be directly embodied by the execution of the hardware decoding processor, or by the execution of a combination of hardware and software modules in the decoding processor. The software modules may be located in a storage medium commonly used in the art, such as a random access memory, flash memory, read-only memory, programmable read-only memory or electrically erasable programmable memory, or register. The storage medium is located in the memory, and the processor reads the information in the memory and completes the actions of the above method in combination with its hardware.

It should be understood that the memory in implementations of the present disclosure may be a transitory memory or non-transitory memory, or may include both transitory and non-transitory memory. The non-transitory memory may be a read-only memory (ROM), programmable ROM (PROM), an erasable programmable ROM (EPROM), an electrically erasable programmable ROM (EEPROM), or a flash memory. The transitory memory may be a random access memory (RAM) which serves as an external cache.

As an example, but not as a limitation, many forms of RAMs are available, such as a static random access memory (SRAM), a dynamic random access memory (DRAM), a synchronous dynamic random access memory (SDRAM), a double data rate SDRAM (DDR SDRAM), an enhanced SDRAM (ESDRAM), a Synchlink DRAM (SLDRAM), and a Direct Rambus RAM (DR RAM). It should be noted that the memories of the systems and methods described herein are intended to include, but are not limited to, these and any other suitable types of memories.

Those of ordinary skill in the art will recognize that the exemplary units and algorithm acts described in connection with the implementations disclosed herein may be implemented in electronic hardware, or a combination of computer software and electronic hardware. Whether these functions are implemented in hardware or software depends on a specific application and design constraint of the technical solution. Skilled in the art may use different manners to realize the described functions for each particular application, but such realization should not be considered to be beyond the scope of the present disclosure.

Those skilled in the art may clearly understand that for convenience and conciseness of description, the specific working process of the system, device and unit described above may refer to the corresponding process in the aforementioned implementations of methods, and details are not described herein again.

In several implementations provided by the present disclosure, it should be understood that the disclosed systems, apparatuses and methods may be implemented in other ways. For example, the apparatus implementations described above are only illustrative, for another example, the division of the units is only a logical function division, and there may be other division manners in actual realization. For still another example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The units described as separated components may or may not be physically separated, and the component shown as a unit may or may not be a physical unit, i.e., it may be located in one place or may be allocated over multiple network units. Some or all of the units may be selected according to practical needs to achieve a purpose of the solution of the implementations.

In addition, various functional units in various implementations of the present disclosure may be integrated in one processing unit, or various units may be physically present separately, or two or more units may be integrated in one unit.

The functions may be stored in a computer readable storage medium if implemented in a form of a software functional unit and sold or used as a separate product. Based on this understanding, the technical solution of the present disclosure, in essence, or the part contributing to the existing art, or the part of the technical solution, may be embodied in the form of a software product stored in a storage medium, including several instructions for causing a computer device (which may be a personal computer, a server, or a network device, etc.) to perform all or part of the acts of the methods described in various implementations of the present disclosure. The aforementioned storage medium includes various media capable of storing program codes, such as a U disk, a mobile hard disk, a read-only memory (ROM), a random access memory (RAM), a magnetic disk, or an optical disk.

The foregoing are merely exemplary implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure should be subject to the protection scope of the claims.

What is claimed is:

1. A terminal device, comprising: a transceiver and a processor, wherein
   the processor is used for determining at least one target discontinuous reception (DRX) indication signal among multiple DRX indication signals or a time-frequency resource position occupied by the at least one target DRX indication signal, wherein the at least one target DRX indication signal is used for indicating whether the terminal device detects a downlink control channel in one DRX cycle after the transceiver receives the at least one target DRX indication signal, without changing the DRX cycle;
   the processor is further used for detecting a DRX indication signal sent by a network device according to the at least one target DRX indication signal or the time-frequency resource position occupied by the at least one target DRX indication signal; and
   the processor is further used for determining the at least one target DRX indication signal according to an identification of a cell where the terminal device is located.

2. The terminal device according to claim 1, wherein the processor is specifically used for:
   determining the at least one target DRX indication signal according to first characteristic identification information, wherein the first characteristic identification information is used for identifying the terminal device.

3. The terminal device according to claim 2, wherein the first characteristic information comprises at least one piece of following information: an identification of the terminal device, an identification of a terminal device group to which the terminal device belongs, a coverage enhancement level of the terminal device, and a network access level of the terminal device.

4. The terminal device according to claim 2, wherein the processor is further used for determining the time-frequency resource position occupied by the at least one target DRX indication signal.

5. The terminal device according to claim 1, wherein the transceiver is further used for:
   receiving configuration information sent by the network device;
   wherein the processor is specifically used for determining the at least one target DRX indication signal or the time-frequency resource position occupied by the at least one target DRX indication signal according to the configuration information.

6. The terminal device according to claim 5, wherein the transceiver is specifically used for receiving a radio resource control (RRC) signaling sent by the network device, wherein the RRC signaling includes the configuration information.

7. The terminal device according to claim 5, wherein the configuration information includes one piece of following information: an identification of the terminal device, an identification of a terminal device group to which the terminal device belongs, an index of the at least one target DRX indication signal, a time-frequency resource position occupied by the at least one target DRX indication signal, and an index of the time-frequency resource position occupied by the at least one target DRX indication signal.

8. The terminal device according to claim 1, wherein the DRX indication signal is a Zadoff-Chu (ZC) sequence.

9. A network device, comprising:
a processor, used for determining at least one target discontinuous reception (DRX) indication signal among multiple DRX indication signals or a time-frequency resource position occupied by the at least one target DRX indication signal, wherein the at least one target DRX indication signal is used for indicating whether a terminal device detects a downlink control channel in one DRX cycle after receiving the at least one target DRX indication signal, without changing the DRX cycle; and
a transceiver, used for sending one of the at least one target DRX indication signal to the terminal device according to the at least one target DRX indication signal or the time-frequency resource position occupied by the at least one target DRX indication signal,
wherein the processor is further used for determining the at least one target DRX indication signal according to an identification of a cell where the terminal device is located.

10. The network device according to claim 9, wherein the processor is specifically used for:
determining the at least one DRX indication signal according to first characteristic identification information, wherein the first characteristic identification information is used for identifying the terminal device.

11. The network device according to claim 10, wherein the first characteristic information comprises at least one piece of following information: an identification of the terminal device, an identification of a terminal device group to which the terminal device belongs, a coverage enhancement level of the terminal device, and a network access level of the terminal device.

12. The network device according to claim 10, wherein the processor is further used for:
determining the time-frequency resource position occupied by the at least one target DRX indication signal.

13. The network device according to claim 9, wherein the processor is further used for:
determining configuration information, wherein the configuration information is used for the terminal device to determine the at least one target DRX indication signal or the time-frequency resource position occupied by the at least one target DRX indication signal; and
the transceiver is further used for sending the configuration information to the terminal device.

14. The network device according to claim 13, wherein the transceiver is further used for:
sending a radio resource control (RRC) signaling to the terminal device, wherein the RRC signaling comprises the configuration information.

15. The network device according to claim 13, wherein the configuration information comprises one piece of the following information: an identification of the terminal device, an identification of a terminal device group to which the terminal device belongs, an index of the at least one target DRX indication signal, a time-frequency resource position occupied by the at least one target DRX indication signal, and an index of the time-frequency resource position occupied by the at least one target DRX indication signal.

16. The network device according to claim 9, wherein the DRX indication signal is a Zadoff-Chu (ZC) sequence.

17. A method for discontinuous reception, comprising:
determining, by a terminal device, at least one target discontinuous reception (DRX) indication signal among multiple DRX indication signals or a time-frequency resource position occupied by the at least one target DRX indication signal, wherein the at least one target DRX indication signal is used for indicating whether the terminal device detects a downlink control channel in one DRX cycle after receiving the at least one target DRX indication signal, without changing the DRX cycle; and
detecting, by the terminal device, a DRX indication signal sent by a network device according to the at least one target DRX indication signal or the time-frequency resource position occupied by the at least one target DRX indication signal,
wherein determining the at least one target DRX indication signal among multiple DRX indication signals, comprises;
determining the at least one target DRX indication signal according to an identification of a cell where the terminal device is located.

18. The method according to claim 17, wherein determining the at least one target discontinuous reception (DRX) indication signal among multiple DRX indication signals, comprises:
determining the at least one target DRX indication signal according to first characteristic identification information, wherein the first characteristic identification information is used for identifying the terminal device.

19. The method according to claim 18, wherein the first characteristic information comprises at least one piece of following information: an identification of the terminal device, an identification of a terminal device group to which the terminal device belongs, a coverage enhancement level of the terminal device, and a network access level of the terminal device.

20. The method according to claim 18, wherein the method further comprises:
determining, by the terminal device, the time-frequency resource position occupied by the at least one target DRX indication signal.

21. The method according to claim 17, wherein the method further comprises:
receiving configuration information sent by the network device;
wherein determining the at least one target discontinuous reception (DRX) indication signal among multiple DRX indication signals or the time-frequency resource position occupied by the at least one target DRX indication signal, comprises:
determining the at least one target DRX indication signal or the time-frequency resource position occupied by the at least one target DRX indication signal according to the configuration information.

22. The method according to claim 21, wherein receiving the configuration information sent by the network device comprises:
receiving a radio resource control (RRC) signaling sent by the network device, wherein the RRC signaling includes the configuration information.

23. The method according to claim 21, wherein the configuration information includes one piece of the following information: an identification of the terminal device, an identification of a terminal device group to which the terminal device belongs, an index of the at least one target DRX indication signal, a time-frequency resource position occupied by the at least one target DRX indication signal, and an index of the time-frequency resource position occupied by the at least one target DRX indication signal.

24. The method according to claim 17, wherein the DRX indication signal is a Zadoff-Chu (ZC) sequence.

25. A method for discontinuous reception, comprising:
determining, by a network device, at least one target discontinuous reception (DRX) indication signal among multiple DRX indication signals or a time-frequency resource position occupied by the at least one target DRX indication signal, wherein the at least one target DRX indication signal is used for indicating whether a terminal device detects a downlink control channel in one DRX cycle after receiving the at least one target DRX indication signal, without changing the DRX cycle; and
sending, by the network device, one target DRX indication signal of the at least one target DRX indication signal to the terminal device according to the at least one target DRX indication signal or the time-frequency resource position occupied by the at least one target DRX indication signal,
wherein determining the at least one target DRX indication signal among multiple DRX indication signals comprises:
determining the at least one target DRX indication signal according to an identification of a cell where the terminal device is located.

26. The method according to claim 25, wherein determining the at least one target discontinuous reception (DRX) indication signal among multiple DRX indication signals, comprises:
determining the at least one target DRX indication signal according to first characteristic identification information, wherein the first characteristic identification information is used for identifying the terminal device.

27. The method according to claim 26, wherein the first characteristic information comprises at least one piece of following information: an identification of the terminal device, an identification of a terminal device group to which the terminal device belongs, a coverage enhancement level of the terminal device, and a network access level of the terminal device.

28. The method according to claim 26, wherein the method further comprises:
determining, by the network device, the time-frequency resource position occupied by the at least one target DRX indication signal.

29. The method according to claim 25, wherein the method further comprises:
determining, by the network device, configuration information, wherein the configuration information is used for the terminal device to determine the at least one target DRX indication signal or the time-frequency resource position occupied by the at least one target DRX indication signal; and
sending, by the network device, the configuration information to the terminal device.

30. The method according to claim 29, wherein sending the configuration information to the terminal device comprises:
sending a radio resource control (RRC) signaling to the terminal device, wherein the RRC signaling comprises the configuration information.

31. The method according to claim 29, wherein the configuration information includes one piece of the following information: an identification of the terminal device, an identification of a terminal device group to which the terminal device belongs, an index of the at least one target DRX indication signal, a time-frequency resource position occupied by the at least one target DRX indication signal, and an index of the time-frequency resource position occupied by the at least one target DRX indication signal.

32. The method according to claim 25, wherein the DRX indication signal is a Zadoff-Chu (ZC) sequence.

* * * * *